J. V. BECKA.

BOX FOR ELECTRIC METERS.

APPLICATION FILED MAY 23, 1919.

Reissued July 1, 1919.

14,677.

2 SHEETS—SHEET 1.

Inventor

John V. Becka

By Bates & Macklin

Attorney

J. V. BECKA.

BOX FOR ELECTRIC METERS.

APPLICATION FILED MAY 23, 1919.

Reissued July 1, 1919.

14,677.

2 SHEETS—SHEET 2.

Inventor

John V. Becka

By Bates & Macklin

Attorneys

THE COLUMBIA PLANOGRAPH CO., WASHINGTON, D. C.

UNITED STATES PATENT OFFICE.

JOHN V. BECKA, OF CLEVELAND, OHIO.

BOX FOR ELECTRIC METERS.

Specification of Reissued Letters Patent. Reissued July 1, 1919.

14,677.

Original No. 1,292,682, dated January 28, 1919, Serial No. 198,807, filed October 27, 1917. Application for reissue filed May 23, 1919. Serial No. 299,345.

*To all whom it may concern:*

Be it known that I, JOHN V. BECKA, a citizen of the United States, residing at Cleveland, in the county of Cuyahoga and State of Ohio, have invented a certain new and useful Improvement in Boxes for Electric Meters, of which the following is a full, clear, and exact description, reference being had to the accompanying drawings.

An object of this invention is to provide a meter housing affording ample protection for a meter contained therein, particularly against surreptitious meddling, and at the same time being so arranged that its interior is readily accessible to properly authorized persons. Another object is to provide a meter housing so constructed that it may be mounted on a wall or set into a partition and be capable of being conveniently built into, and form part of, a foundation wall of a building, whereby the meter may be read from the exterior of the building while a switch within the meter housing may be operated from the interior of the building. Still another object is to so construct the meter housing that it may be very durable, have no parts liable to get out of order and be capable of being comparatively cheaply manufactured.

My invention is hereinafter more fully described in connection with the accompanying drawings. The essential characteristics are set forth in the claims.

Figure 1:
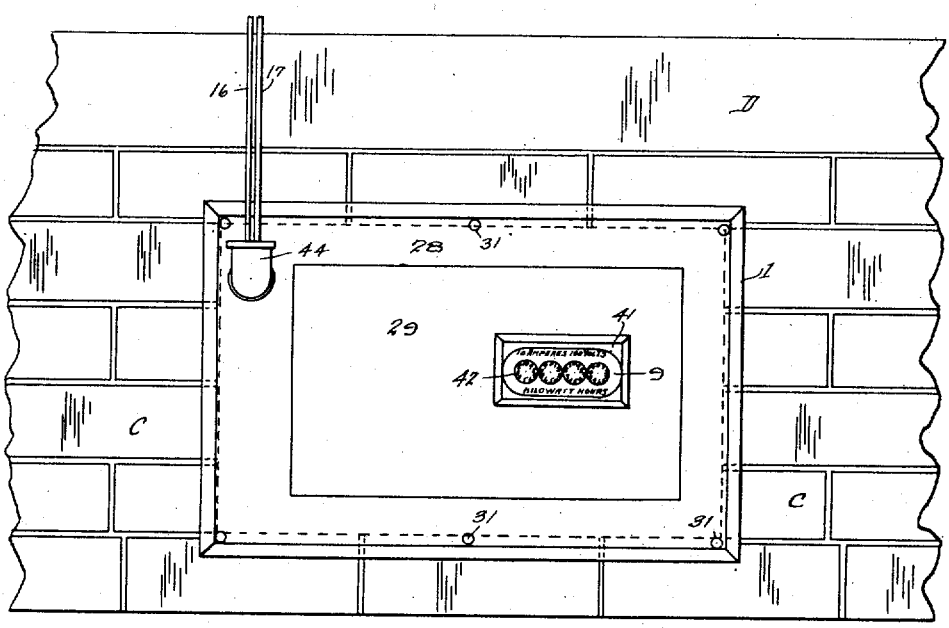
Figure 2:
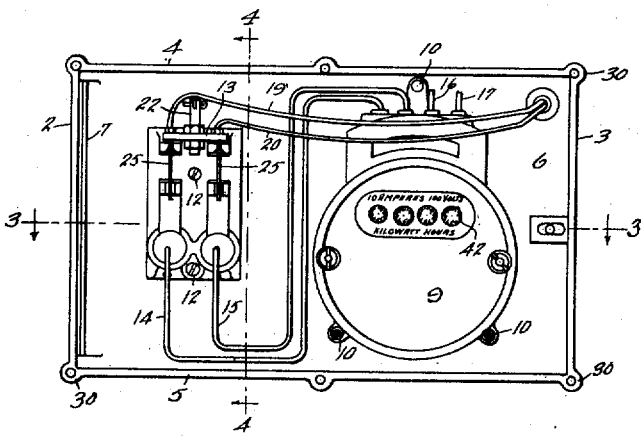
Figure 3:
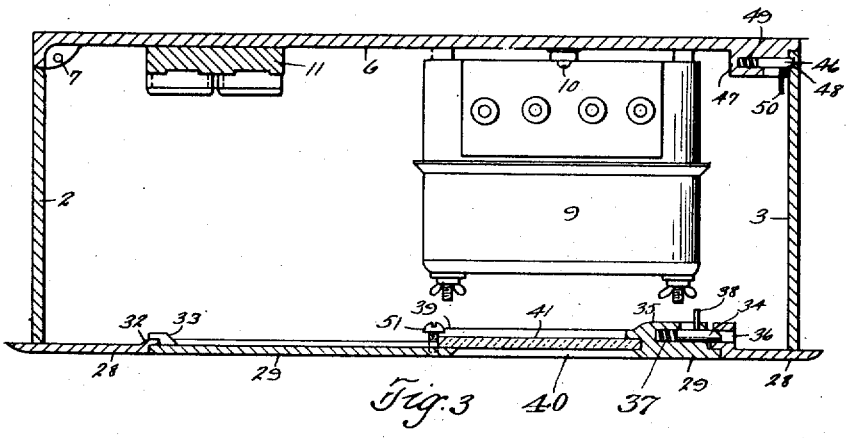
Figure 4:
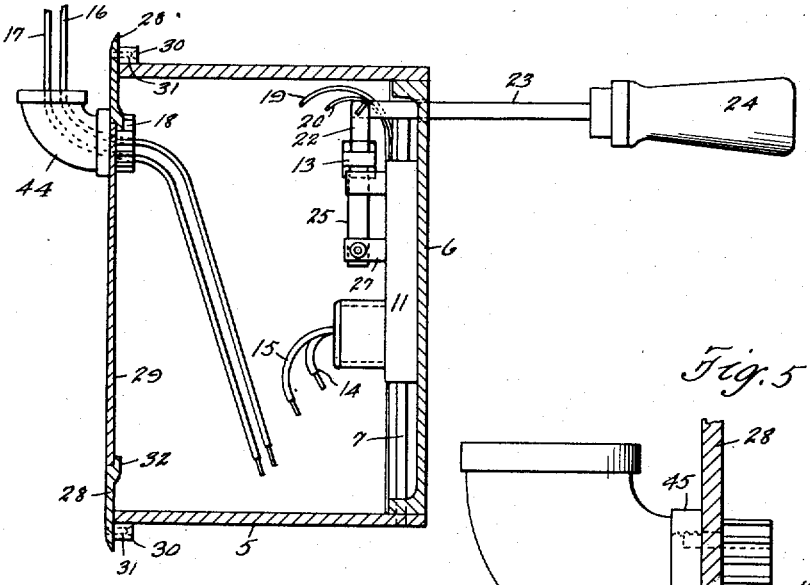
Figure 5:
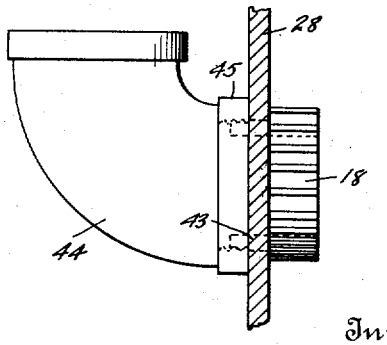

In the drawings, Figure 1 is a side elevation of a meter housing built in position in a building wall; Fig. 2 is a view of the interior of the same with the front cover removed; Fig. 3 is a horizontal section through the same on the line 3—3 of Fig. 2; Fig. 4 is a vertical section on the line 4—4 of Fig. 2; Fig. 5 is an enlarged detail of the removable elbow through which the main conductors pass.

The drawings illustrate my meter box as built into a foundation wall of a building, which is frequently the most desirable location for it.

In Fig. 1 I have shown my device held in position in a wall by means of brick work C. 1 indicates the housing itself having end walls 2 and 3 and top and bottom walls 4 and 5 preferably formed integrally with one another. The rear wall 6 is hinged by a rod 7 to the top and bottom walls and when closed preferably fits tightly between the top and bottom walls.

The rear wall 6 is normally closed by a latch, as shown in Fig. 3. This latch comprises a plunger 46, carried within a boss 47 on the rear wall 6, normally forced into a recess 48 in the end wall 3 by means of a spring 49. The plunger 46 carries an outwardly extending pin 50 which may be engaged by one's finger, within the box, to withdraw the plunger 46 out of engagement with the recess 48.

An electric meter 9 is attached to the rear wall 6 by means of screws 10. Adjoining the meter is an insulating block 11 held to the rear wall by means of screws 12 and carrying a knife blade switch. Two lead wires 14 and 15 connect the fuse plug terminals of the switch with the meter. Wires 19 and 20 connect the other terminals of the switch with the lighting circuit within the building. Main wires 16 and 17, shown as extending through a removable elbow 44, connect the meter with the trunk circuit.

Rigid with the knife blades 25 is a bridge member 13, which carries an upwardly projecting stud 22, pivotally connected to the inner end of a rod 23, shown as extending loosely through an opening in the casing and provided with a handle 24. The knife blades are pivoted in the usual manner, so that the switch may be opened or closed by moving the rod, which, when the housing is built in a foundation or other outside wall, may be accomplished by an operator within the building.

The front wall or cover of the casing preferably comprises two plates 28 and 29, in the same plane. The plate 28 is permanently secured to lugs 30 on the top, bottom and side walls of the housing by means of bolts or screws 31. In the plate 28 is a large rectangular opening surrounded by inwardly offset flanges 32, which position the plate 29 fitting this opening. Lugs 33 integral with the plate 29, at one end thereof extend inwardly and embrace the flange while the opposite end of the plate 29 is secured by means of a latch. This latch comprises a plunger 34 slidable in a boss 35 on the plate 29, and urged into a recess in a boss 36 on the plate 28, by means of a spring 37. The plunger 34 carries an outwardly extending pin 38, which may be engaged by one's finger, within the box, to draw the plunger 34 out of engagement with its recess.

The plate 29 has grooved portions 39 adjacent the opening 40 which carry a pane of glass 41. This glass pane stands directly in front of the dials 42 of the meter. The meter may accordingly be read from the outside through the glass without opening the box. Should it be necessary to open the box this is accomplished by breaking the glass, inserting the fingers through the opening and pulling back the latch 34. The glass pane is preferably stamped or marked officially, so if broken, it must be replaced by an authorized person, otherwise notice is automatically given of tampering.

A screw 51 prevents removal of the glass while allowing replacement before the plate 29 is positioned. Breaking the glass permits removal of the plate 29, as stated, and then access may be had to the rear cover when the plate 29 is off, but merely breaking the glass does not permit opening of the rear door. The releasing of the latch 46 from within the box enables relative movement between the casing and the rear door.

This exposes the meter and switch to allow testing, removing or installing of the meter or other parts. When the casing is built into a wall, as shown, these parts swing with the rear door into the building where an operator may conveniently work on them.

In Fig. 5 I have shown a detail of a removable elbow 44, through which the main conductors may enter. This elbow is held by a bushing 18 which passes through the wall 28 and screws into the elbow, until flanges 45 of the elbow and an enlarged head on the bushing firmly engage the plate 28 on the opposite sides.

It will be noticed that in this invention, the casing or box may readily be of such size that it takes the place of a convenient number of bricks or one or more of the stones in the foundation wall of a building. When so used, the stationary front overhangs the opening occupied by the box, making the construction weather tight, and accomplishing the very desirable result of allowing the inspector to read the meter without requiring access to the building. This saves loss of time for the inspector and relieves the occupants of the building from intrusion. The device is inexpensive, while affording very effective protection to the meter and at the same time allowing ready access to authorized persons.

Having thus described my invention, what I claim is:

1. In a device of the character described, the combination of a casing adapted to be placed in a wall of a building and entirely inclosing a meter, a glass window opposite the meter in the outer wall of the casing, a switch operable from the interior of the building, closures allowing access to the casing and latches for the closures accessible only from the interior of the casing.

2. A housing adapted to be built into a wall comprising a box having four stationary walls and a removable front and rear wall the rear wall being adapted to swing inwardly, the front wall being removable, blind latches preventing such movement, and a window for reading the meter.

3. A housing having parallel end walls and top and bottom walls adapted to be built into the wall of the building, a front wall having an orifice permitting access to the casing, the rear wall being hinged to swing inwardly, the meter and switch being carried by the rear wall, and a blind lock for the rear wall operable from the interior and accessible from the outside only.

4. A meter housing having end walls and parallel connecting top and bottom walls and a removable front wall and adapted to be built into the wall of a building, a rear wall for the housing hinged at one end and swinging into the rear side of the box and arranged to closely fit at its top and bottom edges between the top and bottom walls, a latch operable from the interior only and acting to hold the rear wall closed, and a window in the front wall opposite the meter.

5. The combination of a casing, an electric meter and an electric switch within the casing, means extending through the rear wall of the casing for operating the switch, a removable front wall for the casing, a glass pane carried by the front wall in juxtaposition with the meter face, and a blind latch for the front wall accessible through the opening occupied by the glass pane.

6. The combination of a casing, a hinged rear wall therefor, a meter carried by the rear wall and facing in the opposite direction, a removable front plate for the casing having a sight opening opposite the face of the meter, latches for the hinged rear wall and the front plate accessible only from the interior of the casing, and a glass pane normally closing the opening through the front plate and secured in place by means on the inner side of the plate.

7. The combination of a casing having an overhanging front, a rear wall hinged to the casing, an electric meter secured by the rear wall and facing outwardly, a window through the front standing opposite the meter when it is in the casing, and a lock for the rear wall accessible from the interior.

8. A housing comprising top and bottom and end walls rigidly connected, a removable front wall and a rear wall hinged to permit relative swinging movement between the rear wall and the remainder of the housing, blind latches for securing the front and rear walls, and a window for reading the meter.

9. A meter housing having parallel end walls and connecting top and bottom walls and a removable front wall, a rear wall for the housing hinged thereto allowing a relative swinging movement of the rear wall and the remainder of the housing and arranged to fit the rear side of the box, a latch operable from the interior only and acting to hold the rear wall closed, and a window in front of the wall opposite the meter.

10. A housing having parallel end walls and top and bottom walls rigidly connected, a front wall having an orifice permitting access to the casing, a rear wall hinged to permit relative swinging movement between the rear wall and the remainder of the housing, a blind lock for the rear wall operable from the interior of the housing only, and accessible from the outside only, and a glass window for reading the meter carried by the rear wall.

11. The combination of a casing, an electric meter and switch within the casing, means extending through a wall of the casing for operating the switch, a removable front wall for the casing, a glass pane carried by the front wall opposite the meter face, and a blind latch for the front wall accessible through the opening occupied by the glass pane.

12. The combination of a casing, a rear wall therefor, a meter carried by the rear wall and facing in the opposite direction, a removable front wall for the casing having a sight opening opposite the face of the meter, a latch for holding the rear wall closed, a front plate and a latch for holding the front plate in position, said latches being accessible only from the interior of the casing, and a glass pane normally closing the opening through the front plate and secured in place by means on the inner side of the plate, said rear wall being hinged to the casing in such manner as to allow relative swinging movement of the casing and rear wall.

JOHN V. BECKA.

Copies of this patent may be obtained for five cents each, by addressing the "Commissioner of Patents, Washington, D. C."